United States Patent [19]

Gzemski

[11] 3,903,706

[45] Sept. 9, 1975

[54] INSULATING AND PROTECTIVE STRUCTURE FOR FROZEN SUBSTRATES

[75] Inventor: Felex C. Gzemski, Glen Mills, Pa.

[73] Assignee: Atlantic Richfield Company, Los Angeles, Calif.

[22] Filed: Apr. 11, 1974

[21] Appl. No.: 459,999

[52] U.S. Cl. .................. 61/50; 61/36; 106/281; 252/62; 404/31
[51] Int. Cl.² ............... E02D 27/32; C04B 43/00; C08L 95/00
[58] Field of Search .......... 61/50, 36 A, 35; 404/31, 404/28, 27, 71, 72; 252/62; 106/281

[56] References Cited
UNITED STATES PATENTS

| | | | |
|---|---|---|---|
| 3,411,927 | 11/1968 | Brouk | 106/281 |
| 3,489,685 | 1/1970 | Kublicki | 252/62 |
| 3,654,766 | 4/1972 | Schuh | 61/50 |

*Primary Examiner*—Jacob Shapiro
*Attorney, Agent, or Firm*—John C. Martin, Jr.

[57] ABSTRACT

An insulating and protective structure for frozen substrates wherein a layer of expanded perlite particles, each particle coated with a bituminous coating composition, is applied to the frozen substrate.

This structure is designed particularly for application to substrates underlain with permafrost in the Arctic and sub-Arctic regions. It is designed to provide low thermal conductivity and to have sufficiently high compressive strength such that it will keep the substrate frozen even under thawing conditions and thus provide a base layer for roadways and other structures superimposed thereon.

6 Claims, No Drawings

INSULATING AND PROTECTIVE STRUCTURE FOR FROZEN SUBSTRATES

BACKGROUND OF THE INVENTION

The regions of the Arctic and sub-Arctic zones wherein perpetually frozen ground starts a few feet below the surface and extends downwardly to great depths are generally referred to as the permafrost regions. This permafrost is permanently frozen ground and consists of mixtures of varying content of water, salt, sand, and gravel. In many cases the ice content of the upper portions may exceed 90 percent of the total volume. This obviously is susceptible, therefore, to thawing whenever ambient temperatures exceed the freezing point of water.

At the surface of the ground there is an active growth layer called the tundra which covers the permafrost. In the winter months the ground is frozen solidly to the very surface of the tundra, but in the spring and summer thawing occurs to varying depths ranging from a few inches to several feet in an area between the tundra mat and permafrost zone which is called the "active layer." If left undisturbed, the spring and summer thaw converts the tundra and active layer into a soggy marsh and, thus, the solid frozen ground which during the winter months can support excessively heavy loads, in the summer months is virtually incapable of being traversed by wheeled vehicles. Moreover, if during the winter months vehicles traverse an area of the tundra to such an extent that its surface is rutted even to a relatively small degree, these ruts in the summer may subside or erode and can become gullies which release torrential and damaging run-offs, thus potentially permanently damaging the underlain permafrost and additional tundra structure.

The most common method of constructing roads, airfields and similar structures proposed for the permafrost region comprises depositing gravel on top of the tundra to a depth such that the gravel provides an insulating layer below which the active layer region remains frozen even during the summer thaws thereby protecting the underlain permafrost and, thus, provides a solid base for the roadway or other similar structures. Ideally, this gravel layer is sufficiently thick such that the frozen condition will actually form or penetrate up into the lower portion of the roadway gravel itself. In order to provide this insulating and protective structure, the gravel thickness generally ranges from about at least 3 feet in the northernmost areas of the Arctic wherein the ambient summer temperatures are relatively low, and permafrost moisture content is relatively high, to 8 feet or more in the southern parts of the Arctic or sub-Arctic regions wherein higher ambient spring and summer temperatures are encountered and for longer times. Often it is necessary to transport the gravel for such structures considerable distances when obviously little is available locally in many regions. This may be exceedingly costly and, consequently, proposals have been made heretofore for providing other means for insulating and protecting the frozen Arctic and sub-Arctic substrates utilizing various methods of construction.

One of these proposals is set forth in U.S. Pat. No. 3,279,334 to Quartararo. It is proposed in this Patent to place a layer of fiberglass or polyurethane plastic over the frozen ground in the winter months and along the edges of this layer, sheet piling is forced into the ground to prevent drainage and to prevent thawed soil from penetrating the frozen ground under the insulation and, thus, weakening the base. A layer of gravel is placed above the layer of fiberglass or polyurethane and finally a concrete road surface is applied on top of the gravel. The mean ambient temperature and duration during the summer months of the year is determined and thereafter there is selected the required thickness of the insulating plastic from known tables of insulating materials which will prevent a temperature rise in the base to a surface thawing temperature during the summer months.

The present invention not only obviates the need for great thicknesses of gravel such as that described hereinbefore and in general use in the Arctic and sub-Arctic regions, but it also obviates the disadvantages and provides advantages over other prior art structures such as that of the Quartararo Patent.

In the structure of the instant invention a layer of expanded perlite particles or granules each particle coated with a bituminous coating composition is applied to the frozen substrate whether it be permafrost or tundra. This layer of particles can range in thickness from as little as 1 inch up to as much as one foot, the thickness being varied in accordance with the insulation requirements. After this layer of insulating material has been applied, the gravel for a roadway or airstrip can be laid on top of it but the thickness of such gravel layer will be greatly reduced since it is no longer required to be the sole insulating material but merely furnishes the bearing surface for the wheeled vehicles or other structures, such as buildings, tanks or the like which may be placed thereon.

SUMMARY OF THE INVENTION

In accordance with this invention the naturally occurring mineral perlite is heated to an elevated temperature such that is expands to form a bead-like composition which is a well-known phenomena. These expanded perlite particles are then coated with a bituminous composition to form the described coated particles. It is preferred to put a sufficiently thick coating on the beads such that they are relatively impermeable to water. A layer of these beads is then applied to the frozen substrate, i.e., permafrost or tundra by any convenient method such as a mechanical screed device, i.e., a paving machine which will lay the beads in uniform strips, or by hand raking, spraying or any similar means. The thickness of the layer should be sufficient such that it will thermally insulate the frozen substrate to keep it in the frozen condition even when ambient temperatures are above the freezing point or when heat emitting structures are placed thereon such as buildings, tanks, and the like. By maintaining the substrate in the frozen condition its strength is also maintained and, thus, it provides the desired supporting strength for the super structures placed thereon, for example, roadways, airstrips, buildings, tanks, and the like.

It is an object of this invention, therefore, to provide a frozen substrate protective structure which has a low thermal conductivity for the protection and prevention of thawing of the frozen substrate.

It is another object of this invention to provide a frozen substrate protective structure of a low thermal conductivity suitable for the protection and prevention of thawing of the permafrost or frozen tundra in the Arctic or sub-Arctic regions.

It is another object of this invention to provide a frozen substrate protective structure having a low thermal conductivity and sufficiently high compressive strength such that it will support other structures placed thereon.

It is another object of this invention to provide a frozen substrate protective structure having a low thermal conductivity suitable for prevention of the thawing of the permafrost or frozen tundra in the Arctic and sub-Arctic regions and having sufficient compressive strength such that gravel roadways and airstrips can be placed thereon.

Other objects of this invention will be apparent from the following description and from the claims.

DESCRIPTION OF THE INVENTION

Any porous inorganic material such as expanded volcanic materials of the nature of perlite, volcanic ash, obsidian tuff, and the like and other porous inorganic aggregates such as expanded vermiculite, haydite, pumice, scoria, and the like can be used as the insulating material to be coated with the bituminous composition. The preferred material, however, is granular expanded perlite.

Perlite is a volcanic glass having a chemical analysis showing generally a silica ($SiO_2$) content of from 65 to 75 percent by weight, an alumina ($Al_2O_3$) content of from 12 to 18 percent by weight, a water content of from about 2 to 6 percent by weight, and small amounts of the oxides of sodium, potassium, calicum, iron, and magnesium with trace amounts of other elements and their oxides. By reason of the water content in its structure, the raw perlite is finely divided form can be flash heat expanded at temperatures above about 1600°F. ranginng up to 2000°F., or above with some ores. The crude rock pops in a manner similar to popcorn as the combined water vaporizes and creates countless small cells in the heat softened glassy particles. This material is of low density and has good resistance to relatively high temperatures and also has good insulating properties.

The expanded perlite even when dry in bulk form has a tendency to settle and compact, thus reducing its insulating properties, and since it is easily wetted by water, the bulk form has a tendency to take up and retain water to an extent which seriously adversely effects its insulating properties. Moreover, the expanded perlite is a physically fragile material which cannot be handled mechanically without developing excessive amounts of fines.

Accordingly, therefore, in order to obviate these disadvantages, expanded perlite which is to be used as an insulating material is coated with a bituminous material which provides moisture penetration resistance to the particles as well as improves their ability to be handled mechanically without fracture and production of fines.

Expanded perlite can vary in bulk density over a range of from as little as 2 pounds per cubic foot to as much as 20 pounds per cubic foot. The parameters which influence the density include the water content of the raw perlite, the rate of flash heating, and the temperature of the flash heating, the latter influencing the rate to some extent.

The expanded perlite particles also can vary over a considerable size range. It has been found that certain gradation of sizes is desirable for structural stability. Such gradation is preferably expressed in terms of a sieve analysis (U.S. Standard Sieve) as follows for a typical expanded perlite:

| Mesh Size | % Retained by Volume - Cumulative |
|---|---|
| 8 | 0–20 |
| 16 | 35–85 |
| 30 | 55–95 |
| 50 | 70–95 |
| 100 | 90–100 |

Since the particles are to be coated with a bituminous coating, excessive fines, i.e., particle sizes passing through a 100 mesh sieve require larger quantities of bituminuous coating which in turn increases the thermal conductivity of the coated mixture. Hence, the gradation set forth is preferred for the composition useful in this invention.

Likewise, it is preferred that the perlite used in this invention have a bulk density in the range of from about 8 to 15 pounds per cubic foot. Lower densities have larger unit surface area, i.e., a substantial amount of fine particles thus requiring more bituminous coating material. High densities, on the other hand, while requiring less bituminous coating also cost more to ship and handle — hence densities in the middle of the range are preferred.

In producing the bituminous coated perlite, therefore, it is necessary to control both the particle size gradation and bulk density in order to provide structural stability with minimal use of bituminous coating in order to prevent excessive increase in thermal conductivity over the loose perlite. When employing the above described particle size range and bulk density, the amount of bituminous coating required is in the range of from about 10 to 20 volume percent or from about 40 to 50 weight percent.

It is preferred that for the purposes of this invention that the bituminous coated perlite be compacted to provide maximum structural stability. In compacting, in general, for example, a loose fill of 1⅜ inches in depth will be decreased to 1 inch while 6⅞ inches of loose fill will be decreased to 5 inches, approximately. Thus, the density will also be increased. The coated material as produced will have a density in the range of from 12 to 18 pounds per cubic foot while after proper compaction the density will be increased to from about 22 to 26 pounds per cubic foot. Additional information on the production of expanded perlite and coating such material with asphalt can be found in U.S. Pat. Nos. 2,625,512 (1953) and 3,411,927 (1968).

One method of producing bituminous coated granular perlite particles is shown in U.S. Pat. No. 2,935,412 (1960). In other methods used commercially, the expanded perlite particles while still hot from expansion step are contacted with powdered high softening point asphalt, i.e., asphalt that has a softening point of about 300°F. as measured by ASTM method D-28-51-T and a penetration of from 0 to 1 as measured by ASTM method D-5-52 (77°F., 100 gms., 5 secs.). Such commercial materials wherein a high softening point asphalt is employed is designed particularly for application in temperate zones as described. If these materials are utilized in Arctic zones, however, at the extremely low temperatures encountered particularly in the winter months, the asphalt would become so hard and brittle that it would likely crack and break away, i.e., "spall" from the perlite particles. Accordingly, it is preferable to employ an asphalt having a penetration in the range of from 200 to 300 as the coating material.

In U.S. Pat. No. 2,824,022 there is described a method for expanding perlite and immediately coating the hot expanded perlite with asphalt. The method involves utilizing an asphalt emulsion to coat the hot expanded perlite. The water vaporizes cooling the perlite and leaving a coating of asphalt on the perlite. A similar method which can be employed with even greater efficiency is to remove the hot expanded perlite from the kiln or expansion chamber by means of a properly pitched screw of similar conveying means, allowing the perlite to cool to a desired lower temperature such as 1200°F. or below and then spraying hot asphalt or similar bituminous material through multiple atomizing nozzles onto the expanded perlite to coat the particles evenly. Such a method prevents to a very large degree degradation of the perlite particles which because of their inherent fragile nature are converted to considerable amounts of fines when ordinary mixing methods are employed.

The atomizing coating method also is amenable to "on-site" production, i.e., the crude perlite and bituminous material are transported to the site where a portable expanding and coating machine produces the finished product at the correct temperature for spreading and compacting. Such machines are available commercially.

Although various coating asphalts have been described, such asphalts are not entirely satisfactory because they vary widely in their temperature susceptibility depending upon the source of the asphalt. For example, the so-called AC-5 viscosity grade asphalts from 15 different sources were found to have viscosities at 39°F. ranging from 54 to 3100 megapoises (shear rate 0.001$^{-1}$ sec). This same group had a penetration range at 77°F. of from 64 to 216. These differences in asphalt and their effect on their low temperature properties make it extremely difficult to find one from a source that provides both the desired elevated and low temperature properties which would prevent it from softening under thawing conditions or cracking and spalling under the extremely low temperatures encountered in the Arctic and sub-Arctic regions. It is preferable, therefore, to provide the bituminous coating composition with an additive which will improve the low temperature properties of the asphalt, for example, low temperature flexibility and ductility while at the same time improves the adhesion, abrasion resistance, decreases tack and the tendency to "bleed" at higher ambient temperatures. In general, polymeric materials can be used for this purpose. For example, conventional general purpose rubbers such as styrene-butadiene rubber, natural rubber, cis-polybutadiene rubber, butyl rubber, ethylene-propylene copolymers, ethyl-propylene terpolymer rubbers, and others have been proposed for blending into asphalt compositions. If the rubber is in a highly cured state, i.e., a state in which it possesses its maximum physical properties, it is difficult to obtain a homogenous solution of the rubber and asphalt. Generally, therefore, solid rubber is pelletized, pulverized, or emulsified into latex form (while in a partially cured or uncured state) and subsequently blended in the asphalt at elevated temperatures. It is necessary in order to obtain compatibility of the rubber and the asphalt to mix and mill the combination at elevated temperatures for a considerable length of time in order to achieve the best physical properties of the blend. While such materials can be utilized in producing the bituminous coated perlite particles of the invention, however, since the bituminous composition is quite viscous, it is necessary to either melt the asphalt and add it to the hot porous material tumbling the porous material in the asphalt in order to obtain the desired coating or alternatively to produce an emulsified cut back solution of the asphalt and produce a cold mix coated material.

As has been pointed out, tumbling methods are not desirable since they tend to break the fragile perlite particles into fines, whereas emulsions add water which is absorbed by the perlite and is difficult to remove therefrom. A more preferable polymer asphalt composition is shown in U.S. Pat. No. 3,637,558 (1972). These compositions contain asphalt and a urethane which is the reaction product of a diisocyanate with an intermediate polyhydroxy polymer having an average of at least about 1.8 predominantly primary, terminal, allylic hydroxyl groups per molecule and being an addition polymer of 0–75 percent by weight of an alpha-olefinic monomer of 2 to 12 carbon atoms, and about 25 to 100 percent of a 1,3-diene hydrocarbon of 4 to about 12 carbon atoms, the intermediate polyhydroxy polymer having a viscosity at 30°C. of about 5–20,000 poises and a number of average molecular weight of about 400–25,000. The urethane component is at least partially uncured when combined with the asphalt and the curing is completed when the asphalt is heated.

In a copending application in which the present inventor is one of the inventors, a bituminous composition having excellent low temperature flexibility and ductility for coating aggregate particles of roadways located in the Arctic and sub-Arctic regions comprises an oxidized crude oil residuum or similar asphaltic material containing a polyurethane produced in situ from a polyol and an isocyanate, it being critical that the ratio of the polyol hydroxyl groups to the isocyanate groups being greater than 1 and that the polyurethane is chemically bound to the oxidized residuum. When the residuum is oxidized there is produced by the oxidation process hydroxyl groups in this bituminous material. The polyol is then added to the oxidized residuum and finally the isocyanate, preferably a diisocyanate, is added. The diisocyanate reacts with a polyol to produce the polyurethane polymer and in addition some of the diisocyanate molecules cross-link the polyurethane to the oxidized residuum, thus, there is produced a bituminous composition containing a high molecular weight polyurethane polymer chemically combined to the asphalt. This is the most preferred composition for coating the granular perlite particles for use in the instant invention.

Since it is an important feature of this invention that the compositions employed be suitable for the Arctic and sub-Arctic regions, the invention will best be described with reference to components obtainable in the North Slope Alaskan oil fields such as the Prudhoe Bay area. It has been found that when the crude oil from this Alaskan crude source is suitably topped, i.e., an overhead fraction removed therefrom, that the bottoms fraction or residuum is an excellent source of bituminous material for the bituminous coating component of this invention.

In order to obtain this bituminous coating component, this Alaskan crude oil is fractionated to remove about 10 volume percent initially and then an additional 20 volume percent for use as diesel fuel leaving about a 70 volume percent bottoms fraction, frequently referred to as the bottoms fraction or residuals. Although the boiling range will, of course, vary somewhat, in general the residual fraction has an initial boiling point of above about 234°F. at 1 atmosphere with a 50 percent point of about 546°F. at 10 millimeters Hg pressure at which point some cracking starts. In general, it can be described as the residuum after removal of overhead material boiling high enough to include the diesel fuel boiling range in accordance with conventional refinery practice. This material is a mixture of straight chain paraffins, iso-paraffins, monocyclic paraffins, polycyclic paraffins, and aromatics, having from 1 to 5 rings including uncondensed and condensed ring compounds as well as alkylated ring compounds. This is a typical residuum analysis for a "long" residuum boiling above the diesel fuel range.

Since this residuum is utilized as the sole source of the bituminous coating component, it is necessary that it be air oxidized in order to produce a component having the desired viscosity characteristics and softening point-penetration relationships. In general, air oxidation is carried out at temperatures of about 400°F. for 5 to 6 hours, although temperatures in the range of from 300° to 550°F. can be used by adjusting the time of the oxidation correspondingly, i.e., 8 to 3 hours. In addition, the rate is effected by the rate of air or other oxygen containing gas introduced into the molten components and also the degree of dispersion of the air or amount of agitation of the mixture.

In addition to providing the desired viscosity, softening point, and penetration characteristics to the bituminous component, the air oxidation also introduces hydroxyl groups into the hydrocarbon molecules of the residuum together with additional amounts of other oxygen containing groups.

Although the bituminous coating component has been described using a 70 percent residual fraction, it will be understood that a "shorter" residuum fraction can also be used as the bitumen source. Thus, for example, if it were found that the crude could be topped to give useful fuel fractions down to a 30 or 40 percent bottoms, this fraction also could be used, although it might require a lesser amount of oxidation to give the desired softening point, penetration, and viscosity characteristics and to provide hydroxyl groups, which oxidized fraction then could be combined with the polymer to provide the bituminous coating of the instant composition.

The elastomeric polymer is produced in situ in the bituminous composition. The polyol is dissolved first in the oxidized bituminous component which has been heated to an elevated temperature, for example, 140° to 160°F. although this range is not critical except except that it should be high enough such that the mixture is sufficiently fluid for good mixing but which is not high enough to cause polymerization of the polyol. The polyol-bituminous component is agitated at elevated temperature for a time ranging from ½ to 4 hours, although generally a mixing time of about 2 hours is sufficient.

A catalyst in catalytic amounts suitable for the production of the polyol-isocyanate polymers, i.e., urethane polymers, is added and blended with the polyol-bituminous component mixture. Since there are frequently ingredients in the bituminous component which might degrade the activity of the catalyst, it is preferred that the isocyanate be added immediately to the polyol-bituminous component-catalyst mixture. Preferably, this mixing should be carried out at temperature in the range of 250° to 300°F. for from ½ to 4 hours and preferably from 1½ to 3 hours to insure complete reaction. If the mixing is carried out at lower temperatures, it may be necessary to allow the mixture to stand at such temperatures for several hours in order to cure, i.e., react, to the desired degree. Alternatively, but less preferable, the isocyanate can be added to the bituminous component-polyol blend and the catalyst added thereafter. In such cases, however, it may be necessary to admix the catalyst with a portion of the bituminous component prior to addition in order to get uniform dispersion. Accordingly, this method is somewhat less preferred but can be used with equal success as the first described method.

In general, from 3 to 20 parts by weight of the urethane polymer is incorporated in 100 parts by weight of the bituminous component. It has been found that amounts in excess of about 10 parts by weight and particularly in excess of 20 parts by weight of the polymer per 100 parts by weight of the bituminous component produced a gel-like structure which is difficult to handle and which does not improve the low temperature properties of the composition sufficiently to warrant the increased difficulty of handling and cost.

In one method of coating the perlite, it has been proposed that the bituminous component in which the elastomeric polymer has been produced be emulsified with water to produce an aqueous emulsion which is utilized as the coating material. This method would provide a method of terminating the polymerization reaction in the bituminous component since as soon as the bituminous component containing the polyol-isocyanate mixture comes into contact with water the reaction is "killed" by the water and no further polymerization occurs. Practically, however, since the perlite takes up water very readily such a method of coating is not used. The viscosity of the bituminous component is, to some extent at least, a function of the molecular weight of the polymer as well as the amount of the polymer contained therein, therefore, it is preferable to control the viscosity of the bituminous component by controlling the molecular weight by conventional means and by controlling the amount of polymer in the bituminous component.

Although any polyol having a substantially hydrocarbon backbone structure and which is soluble in the bituminous component can be employed, a preferred composition is the material sold under the tradename "Poly bd." The preferred Poly bd resins are hydroxyl-terminated polymers based principally on butadiene. The hydroxyl groups are primary and allylic and can be reacted with isocyanates to produce polyurethane elastomers. The preparation and properties of these resins are described in U.S. Pat. Nos. 3,247,366 and 3,333,015.

These polyols can be characterized further as being unsaturated polyhydroxy polymers with number average molecular weights of about 500 to 20,000 having chain olefinic content of about 50–65 percent trans, 15–25 percent cis, and 15–25 percent pendant vinyl along with 2 to 3 hydroxyl groups per molecule, i.e., a polymer based on butadiene. In general, these are also described in detail in the aforementioned U.S. Pat. No. 3,637,558; however, such description therein also includes copolymer compositions including styrene and acrylonitrile but copolymers are not preferred in the bituminous composition wherein the polyurethane is produced in situ; instead only homopolymers based on butadiene are employed.

Although several types of Poly bd liquid resins are produced commercially, a preferred type bears the designation "Poly bd R-45HT." This type is a homopolymer, i.e., it is based entirely on butadiene-1,3. Typically it has a viscosity (poises at 30°C.) of about 50, a hydroxyl content in millequivalents per gram of about 0.80, a moisture content of about 0.05 weight percent, an iodine number of about 3.98, and a number average molecular weight of about 3000. Thus, in general, this resin has an average of from about 2.2 to 2.5 hydroxyl groups per mole. The polybutadiene microstructure is typically: 60 weight percent trans-1,4; 20 weight percent cis-1,4; and 20 weight percent pendant vinyl-1,2. Accordingly, this resin provides hydroxyl groups for reaction with the isocyanate which is added subsequently to produce the urethane polymer.

Any typical diisocyanate or polyisocyanate can be employed for producing the urethane elastomeric polymer. For example, toluene diisocyanate is particularly suitable; however, polymer diisocyanates such as those sold commercially, a preferred example being sold under the tradename of "Hylene TRF," are particularly suitable. The term polyisocyanate as used herein has the same meaning as accepted in the art, i.e., there are only two isocyanate groups per mole, thus, the weight ratio of isocyanate to total polyisocyanate weight is less than for the lower molecular weight compounds such as toluene diisocyanate. Aliphatic, aromatic, and alicyclic polymeric isocyanates and their mixtures can be used, for example, toluene 2,4-diisocyanate; mixtures of toluene 2,4-diisocyanate and toluene 2,6-diisocyanate; diphenylmethane 4,4'-diisocyanate; metaphenylene diisocyanate; hexamethylene diisocyanate; naphthalene 1,5-diisocyanate; 3-isocyanatomethyl-3,5,5-trimethylcyclohexyl isocyanate; 2,2,4-trimethylhexamethylene 1,6-diisocyanate, and hexamethylene diisocyanate.

It is necessary to employ a ratio of polyol to isocyanate such that there is an excess of hydroxyl groups over isocyanate groups rather than the usual prior art excess of isocyanate groups. It is preferred to employ at least a 10 percent excess of hydroxyl groups from the polyol over the isocyanate groups. In addition, this excess can be as high as 5 times the number of hydroxyl groups compared with isocyanate groups, i.e., a ratio of from 1.1:1 to 5:1. It will be understood that in addition there is an indeterminate number of hydroxyl groups in the oxidized residuum which further increases the excess amount of hydroxyl groups over isocyanate groups. This excess is necessary to prevent excessive crosslinking which would give excessive gel formation and cause problems in using the composition to coat the perlite. Since there are hydroxyl groups in the bituminous component which can react with the isocyanate, the resulting polymer will undergo the proper degree of isocyanate crosslinking between the hydroxyl groups of the polyol and the hydroxyl groups in the bituminous component. The resulting polymer is then chemically combined with the bituminous component.

In the preferred method for producing the elastomeric polymer in situ, the polyol, as had been pointed out, is dissolved in the bituminous component and thereafter there is added a catalytic amount of a catalyst which promotes the polyol-isocyanate reaction as well as the reaction between the function groups of the bitumen and the isocyanate. These catalysts which promote this reaction to produce the polyurethane elastomeric type resins are well known in the polyurethane art. Two catalysts which have been found to be suitable are dibutyltin diluarate and stannous octoate; however, it will be understood that any of the well-known conventional catalysts which promote the polyurethane reaction can be employed. Examples of these are: 2,2-diazabicyclooctane; N,N,N',N' tetramethyl-1,3-butane diamine; triethylamine; N-ethyl morpholine; dibutyltin di-2-ethyl hexoate; stannous oleate, and the like. Combinations of the tin salts and the amines also can be used effectively. It will be understood that the catalyst can be omitted entirely as in polyurethane reactions, but the reaction, i.e., curing time becomes so long that this is completely impractical.

The amounts of the catalyst can range from about 0.01 weight percent to 4.0 weight percent based on the weight of the polyol with a preferred range being from 0.5 to 3 weight percent based on the polyol. It also will be understood that it is preferred to use somewhat larger amounts of catalysts than the amounts normally employed in the polyurethane reaction since the polyol is incorporated into the bituminous component prior to reaction and consequently the catalyst concentration will be somewhat diluted by the bitumen.

The bituminous composition containing the polyurethane polymer can be applied to the expanded perlite in accordance with any of the methods which have been described with respect to asphalt, i.e., by mixing, spraying, and the like. The temperature of the perlite and the temperature of the bituminous coating composition at the time the coating is applied can be varied to suit the ambient temperature conditions when "on-site" production is being employed or if the coating is applied to the perlite and the product shipped, it should be sufficiently free-flowing to be applied evenly but still at a temperature which will allow compaction to improve structural stability. These are all within the skill of anyone skilled in construction.

The coated perlite is distributed on the frozen substrate by any convenient method such as by mechanical screed methods, by hand raking, by spraying or the like. After compaction the gravel for the roadway, airstrip or other superstructure can be placed thereon.

A typical coated perlite will have a thermal conductivity, "K" factor, of about 0.46 measured as BTU/hr/sq. ft./°F./inch thickness at a mean temperature of 75°F. Thus, the thickness required to provide sufficient insulation to maintain the substrate in a frozen condition can be calculated readily from the known history of the ambient temperature variations in a particular area and the duty dictated by the type of superstructure. The structure of this invention for insulating and protecting a frozen substrate can be used in building roadways, landing pads, airstrips, parking areas, and the like by applying the requisite thickness of gravel, for example, on top of the compacted bituminous coated perlite particle layer which in turn is applied on top of the frozen substrate, for example, tundra or permafrost.

Such superstructures are substantially non-heat emitting, in fact, they may provide some additional insulating benefits as well as providing a bearing surface for vehicular traffic.

The structure of this invention can also be used for insulating and protecting frozen substrates under heat-emitting superstructures such as buildings, tanks, pipelines, and the like. In such instances it may be unnecessary to provide an additional layer such as gravel as a bearing surface but other insulating materials such as foam polyurethane layers and the like may also be applied to the upper surface of the bituminous coated expanded perlite particle layer.

In general, the layer of expanded perlite particles coated with the bituminous material can range in thickness from as little as 1 inch, for example, to as much as 1 foot or more. Although loose fill may be used, this is not preferred since compacting in accordance with methods well known to the art increases the structural stability of the layer very markedly without increasing the heat conductivity, i.e., the "K" factor to an extent which is seriously deleterious with respect to the objectives of this invention.

I claim:

1. An insulating and protective structure for frozen substrates particularly in the Arctic and sub-Arctic regions, comprising a layer of bituminous coated expanded perlite particles applied to said frozen substrate wherein said expanded perlite particles are coated with a bituminous material containing sufficient elastomeric polyurethrane polymer to provide the desired high temperature and low temperature properties for use in the Arctic and sub-Arctic regions, said polyurethane being chemically bound to said bituminous material.

2. The structure according to claim 1 wherein said expanded perlite particles are coated with a bituminous composition having excellent low temperature flexibility and ductility and is not deleterious to the thermal insulation properties of said particles comprising an oxidized crude oil residuum containing a polyurethane produced in situ from a polyol and an isocyanate, the ratio of polyol hydroxyl groups to total isocyanate groups being greater than 1, and said polyurethane being chemically bound to said oxidized residuum.

3. The structure according to claim 2 wherein said expanded perlite particles are less than 100 mesh U.S. Standard Sieve size and have a bulk density of from 8 to 15 pounds per cubic foot before being coated with said bituminous coating.

4. The structure according to claim 1 wherein said layer of bituminous coated expanded perlite particles are compacted after being applied to said frozen substrate.

5. The structure according to claim 4 wherein said compacted layer has a bulk density of from 22 to 26 pounds per cubic foot.

6. The structure according to claim 1 wherein said bituminous material comprises an oxidized crude oil residuum.

* * * * *